US009619665B2

(12) United States Patent
Ko

(10) Patent No.: US 9,619,665 B2
(45) Date of Patent: Apr. 11, 2017

(54) METHOD AND SYSTEM FOR ADDING DYNAMIC LABELS TO A FILE AND ENCRYPTING THE FILE

(71) Applicant: Cheng-Han Ko, New Taipei (TW)

(72) Inventor: Cheng-Han Ko, New Taipei (TW)

( * ) Notice: Subject to any disclaimer, the term of this patent is extended or adjusted under 35 U.S.C. 154(b) by 364 days.

(21) Appl. No.: 14/338,233

(22) Filed: Jul. 22, 2014

(65) Prior Publication Data
US 2016/0026827 A1 Jan. 28, 2016

(51) Int. Cl.
  G06F 21/62 (2013.01)
  G06F 17/30 (2006.01)

(52) U.S. Cl.
  CPC .... *G06F 21/6209* (2013.01); *G06F 17/30076* (2013.01)

(58) Field of Classification Search
  CPC ............................ G06F 17/22; G06F 17/2247
  USPC ........................................................ 715/234
  See application file for complete search history.

(56) References Cited

U.S. PATENT DOCUMENTS

| | | | | |
|---|---|---|---|---|
| 5,664,018 A * | 9/1997 | Leighton | ................. | G06F 21/10 283/113 |
| 7,360,093 B2 * | 4/2008 | de Queiroz | ........... | G06T 1/0042 380/217 |
| 7,434,057 B2 * | 10/2008 | Yagawa | .............. | G06F 21/6218 713/176 |
| 7,447,329 B2 * | 11/2008 | Choi | ..................... | G06T 1/0021 235/462.01 |
| 8,065,239 B1 * | 11/2011 | McBride | .......... | G07B 17/00024 705/401 |
| 8,677,132 B1 * | 3/2014 | Liao | ...................... | H04L 9/0888 713/176 |
| 2003/0002068 A1 * | 1/2003 | Constantin | ......... | H04N 1/32101 358/1.15 |
| 2004/0098447 A1 * | 5/2004 | Verbeke | ................ | G06F 9/5055 709/201 |
| 2004/0148356 A1 * | 7/2004 | Bishop, Jr. | ............. | H04L 51/38 709/206 |
| 2005/0120290 A1 * | 6/2005 | Mistry | .................... | G06F 21/10 715/272 |
| 2007/0220614 A1 * | 9/2007 | Ellis | .................... | G06F 21/6245 726/27 |

(Continued)

OTHER PUBLICATIONS

"Securing PDFs with passwords;" Acrobat Help; Nov. 11, 2012; Adobe.com; pp. 1-4.*

*Primary Examiner* — Andrew Dyer
(74) *Attorney, Agent, or Firm* — Muncy, Geissler, Olds & Lowe, P.C.

(57) ABSTRACT

The present invention relates to a method and system for adding dynamic labels to a file and encrypting the file, after having the file be converted and added at least one label related to information about the file and user, the file is encrypted for reading after decryption. First, transferring at least one file by a file upload unit; converting the file from the file upload unit into PDF format by a first file conversion unit, and adding at least one label corresponding to information about the file and its users via a label-adding unit; encrypting the file from the first file conversion unit by an encryption unit to form an encrypted file, and then generating a decryption key corresponding to the encrypted file; saving the encrypted file and the decryption key respectively in a first storage unit and a second storage unit.

12 Claims, 5 Drawing Sheets

(56) References Cited

U.S. PATENT DOCUMENTS

| | | | |
|---|---|---|---|
| 2007/0300220 A1* | 12/2007 | Seliger | G06F 8/61 718/1 |
| 2009/0094576 A1* | 4/2009 | Bouchard, Sr. | G06F 8/30 717/104 |
| 2009/0097699 A1* | 4/2009 | Okihara | G06F 17/2294 382/100 |
| 2011/0125561 A1* | 5/2011 | Marcus | G06Q 20/32 705/14.15 |

* cited by examiner

METHOD AND SYSTEM FOR ADDING DYNAMIC LABELS TO A FILE AND ENCRYPTING THE FILE

FIELD OF THE INVENTION

The present invention relates to a method and system for adding dynamic labels to a file, encrypting and decrypting the file, and then reading the content of the file instantly online, more particularly, which allows users to read confidential files on line and off-line with more Confidentiality, Authenticity, Controllability, Availability, Integrity and Non-repudiation, and allows to reduce the file size significantly. Moreover, the file is encrypted with method corresponding to Advanced Encryption Standard. Moreover, the present invention also discloses a method that allows the allocation of system resources to be optimal.

BACKGROUND OF THE INVENTION

For the governmental, banking, national defense, enterprise, organizational and medical institutions, the flow of their internal information is the data produced, collected and used by these governmental, banking, national defense, enterprise, organizational, and medical institutions during operation. The information could be in various forms. It can be stored in computers (or even in other various kinds of electronic devices) in forms of image file, text files, PDF files, or scanned files, or can be printed on papers. Most of the information mentioned above is usually classified into top secret, secret, confidential or unclassified according to its importance. Some information can be disclosed and viewed by specific persons or the public. However, some information can be disclosed to authorize persons and such information is extremely valuable and intangible asset and has a critical influence. In other words, such information has a determinant and risky influence for governmental, banking, national defense, enterprise, organizational and medical institution, and the files described above are not usually available to be public and falsified, so it needs to be encrypted and certificated to maintain the fairness and justice of social responsibility. In addition, the result of social information technology developing significantly reduces limitations of space and time in the whole world. For this reason, personal privacy should be controlled tightly, especially for some personal information that is not available to disclose to third-party, organizations or others and need to be corresponding to the stringent global personal data protection law, so as to meet the need of personal privacy protection. Therefore, the above information is required to be safely controlled and encrypted, so as to prevent users from reading, downloading or modifying intentionally or unintentionally, and prevent those who steal information such as hackers, commercial espionage, military espionage and internal staff from arbitrarily capturing, decrypting or invading the packets, and communication of information system, and then stealing top secret files or documents such as patent technology, national defense secrets, trade secrets, personal information, banking information, which would result in irreversible consequences that seriously affect the social, economic, and national security.

Watermark is a technology that embeds a label, which can be a representative of the owner or creator to prove ownership. Visible watermark is commonly used and its advantage is that it can recognize what the source is or who the owner of information is without any calculation of algorithm. It also provides information to the reader, so as to indicate what the source is or who the owner of information is, such as a file or document, used in official document of governmental, banking, national defense, enterprises, organizational and medical institutions, is often added with watermark when printing.

QR code is also a widely applied technology and has developed into a three-dimensional QR code now. Its main applications include automatic text transferring, digital content download, the Quick Link, identity identification and e-commercial trade. QR code (Quick Response Code), widely used nowadays, has the superior characteristics of fast encoding and decoding. QR code has the following characteristics: two-dimensional bar code is capable of saving among horizontal and vertical, so the QR code can save more data than other kinds of two-dimensional bar code (small size of the output). It can record more than 7,000 numeric characters or more than 4,000 letters of the alphabet (big storage capacity),If part of QR code is unclear or damaged, the information in QR code can be repaired via Error correction or data restoration method (Good performance of anti-damage).

However, visible watermark or QR code is easy to be covered by graphics software or be removed through signal processing or signal filtering technology. If someone gets a superior access authority for secret files, the watermark or QR code of the secret files could be removed easily. Therefore, it doesn't meet the six core elements ("CACAIN" for short) for information security: Confidentiality, Authenticity, Controllability, Availability, Integrity, Non-repudiation. Generally, algorithm of visible watermark is known to public, while embedding and acquisition technologies of information are also well known. Accordingly, the algorithm does not guarantee the security. In the same way, QR code is also generated by a specific algorithm. The file size when adding visible watermarks or QR code is increasing as the capacity of watermark or page numbers of the file increasing even there are many public and private cloud system, internet hard disk, portable hard disk or small memory cards today. Once the file with a lot of watermark and QR code are saved, it will occupy too much storage space and consume computer memory and will increase the loading of the information system. Finally, it will cause a waste of resources of information systems in future due to lack of stability and internet congestion. According to the results of many research institutions, they estimated that information security of digital data, big data analysis and mobile digital device will explosively grow over the next five to ten years, which will significantly affects the security of the international information.

Furthermore, traditional fax system can transform fax number into e-mail address for receiving or sending a message, and such messages often contain file in TIFF, image and PDF format, and the contents of the fax have no encryption, watermark and label. After the collaborative step of the fax system, the message will be automatically forwarded to the set multiple group mailboxes. However, fax number is used in the same organization and shared by many staffs, which is also a great vulnerability for the information security. E-mail system is more complex. Because forwarding, sending and backup of the e-mail must pass through the e-mail gateway, access times may be recorded but the files within the e-mail that are not encrypted and are not added with watermark and label. Therefore, it cannot effectively manage e-mail attached file and prevent information leakage.

In the digital age now, the cloud, internet drive or online file sharing space, in order to save a lot of files, usually provide only one username and password together with single description key corresponding to username and password as the basis structure for identity certification. However, if a user's password or key was disclosed or stolen, all information of the user account can be arbitrarily watched, shared, accessed, modified and even deleted. Therefore, it has a lot of potential risks in the aspect of information security. For example, general management for computer privileges sharing will not prevent the sharer capturing the image of the content of the file by software, smart phone, digital camera and camera, and then instantly transmitting the important information in the file to personal smart devices via instant messaging software such as Wechat, Line, QQ, Skype and What's app, or sending important information in e-mail attachment to a personal smart devices such as smart phone, smart tablet, private cloud, public cloud, other mailboxes or BYOD (bring your own device). Moreover, in recent years, due to globalization, information flow becomes more collaborative, refinement, service-based, intelligent. As a result, the information is everywhere and everyone can share information in this high speed and multi-tasking digital time, so as to generate the information security problems in some issues such as malicious intrusion, virus infection, authority control, encryption and decryption of BYOD (bring your own device), private cloud and public cloud. These would be the most important issues for information security now and future. Therefore, the present invention will become an important part in multiple information security defenses.

In view of this, the present invention provides a method and system for adding dynamic labels to a file and encrypting the file, avoiding the capacity increase of the file when being added with watermark and OR code, and averagely dividing the system resource to each main thread and each sub-thread for converting or encrypting each file, so as to encrypt and decrypt each file efficiently in real time, and each file is added with IP address, time stamps, special stamps. Advanced Encryption Standard is a block key encryption standard adopted by the U.S. federal government. After selecting for five years, AES was announced by the NIST as U.S. FIPS PUB 197 (FIPS 197) on Nov. 26, 2001 and became effective as a federal government standard on May 26, 2002 after approval by the secretary of commerce. In 2006, the Advanced Encryption Standard encryption has become one of the popular algorithms. The method and system of the present invention use Advanced Encryption Standard key to encrypt each file Even if in the condition where a user's password has been stolen and disclosed, or a server is hacked or its information is stolen by internal staff, the information of each file has specific and multiple key protections, watermark protection, multiple AES protection. Moreover, the method and system of the present invention can divide the recourse of system efficiently, so as to improve significantly the protection for patent, trade secret and the Confidentiality, Authenticity, Controllability, Availability, Integrity and Non-repudiation of information security for governmental, banking, national defense, enterprise, organizational and medical institutions.

SUMMARY OF THE INVENTION

The present invention is directed to solve the problems of information security issues such as easily-removal of watermark and QR code, only one key for the cloud, internet drive or online file sharing space, large file size occupying much storage space and consuming computer memory of the file with a lot of watermark and QR code as described above.

In order to solve above problems, the present invention uses Advanced Encryption Standard encryption technology and provides a method and system for adding dynamic labels to a file and encrypting the file, which can convert the file from different source, through automatic classification such as e-mail attachments audits, fax, scanner, uploading, sharing . . . etc. After having the file be converted and added with at least one label related to information about the file and users, the file is encrypted according to the needs of the users, and the file is classified to different online folders according to different sources and authority for reading after decryption. The method according to the present invention comprises steps of:

Step A: transferring at least one file by a file upload unit;
Step B: converting the file from the file upload unit into PDF format by a first file conversion unit, and adding at least one label corresponding to information about the file and its users via a label-adding unit;
Step C: encrypting the file from the first file conversion unit by an encryption unit to form an encrypted file, and then generating a decryption key corresponding to the encrypted file; and
Step D: saving the encrypted file and the decryption key respectively in a first storage unit and a second storage unit.

The present invention also provides a system for adding dynamic labels to a file and providing encryption in the file, and the system comprises:

a file upload unit for upload one file;
a first file conversion unit, connected with the file upload unit, for converting the file from the file upload unit into PDF format;
a label-adding unit, for adding to the file at least one label corresponding to information about the file and users;
an encryption unit, for encrypting the file from the label-adding unit, so as to form an encrypted file and generate a decryption key corresponding to the encrypted file; and
a first storage unit and a second storage unit for respectively saving the encrypted file and the decryption key from encryption unit;

In implementation, wherein the step B further includes steps of:

B1: converting the file into PDF format to form a first file;
B2: Reading a watermark setting, QR code parameters, and dynamic parameters of quantum random number;
B3: detecting the size of the first file and having the X-axis, Y-axis, the watermark font, and image of the first file zoomed in/out proportionally to a pre-determined size by a size-detecting unit;
B4: dividing the contents of the first file into a plurality of layers and analyzing the pattern dithering of each layer by an image-dividing unit;
B5: setting a X-axis and a Y-axis for each of the layers by an axis-fixing unit;
B6: setting font type, font size and angle of the watermark to be added by a font-setting unit;
B7: hollowing the font of the watermark out by a font-hollowing unit;
B8: adjusting the brightness, transparency and resolution of the layers by a font-adjusting unit;
B9: combining the layers together to form a second file in PDF format by a layer-combining unit;
B10: transferring the second file to the encryption unit.

In implementation, in the above method and system, further comprising a step B(1) between the step B and step C:

B(1): converting the file in PDF format with the label to an image file by a second file conversion unit;

Wherein, in step C, the file in PDF format from the first file conversion unit and the image file from the second file conversion unit are respectively encrypted, and the two decryption keys corresponding to the two encrypted files are respectively generated. In implementation, wherein in the above method and system, the label is watermark, QR code, or a combination of watermark and QR code.

In implementation in the above method and system, wherein the watermark and the QR code respectively store at least one of following instant dynamic information: dynamic parameters of quantum random number, IP address, user address, UUID code, CPU code, device code, finger print, company name, department name, login-in time, upload timestamps, download time stamps, download number stamps, open timestamps, feature code, certification code, registration code, checking point code, and authorization code. In implementation, wherein in the above method and system, further comprise a step C1 between the step C and step D:

C1: compressing the encrypted file by a compression unit;

Wherein, in step D, the encrypted and compressed file and the decryption key are saved respectively in the first storage unit and the second storage unit.

In implementation, in the above method and system, wherein the PDF format in Step B is PDF ISO-32000-2: 2015 (suitable in PDF 2.0), PDF ISO-32000-1:2008 (suitable in PDF 1.7), ISO-32000-15, ISO 15930-1:2001'ISO 15930-3:2002; Extend to PDF/X (ISO standards, applicable to exchange of graphic content), PDF/A (ISO standards, applicable to long-term saving of electronic documents), PDF/E (ISO standards, applicable to the engineering file of interactive exchange), PDF/UA, PDF/VT's; following combination that in accord with PDF standards include: PDF/X (since 2001—series of ISO 15929 and ISO 15930 standards), PDF/A (since 2005—series of ISO 19005 standards), PDF/E (since 2008—ISO 24517), PDF/VT (since 2010—ISO 16612-2), or PDF/UA (since 2012—ISO 14289-1).

In implementation, in the above method and system, wherein the encryption in step C or in the encryption unit uses at least one of the methods including AES-ECB (key length: 128, 192, 256), CBC (key length:128, 192, 256), CTR (key length:128, 192, 256), CCM (key length:128, 192, 256), OFB (key length:128, 192, 256), GCM (key length: 128, 192, 256), CFB 1(key length:128, 192, 256), CFB 8(key length:128, 192, 256), CFB 128(key length:128, 192, 256), RC4 128-bit, RC4 40-bit,DES,TDES and Threefish.

In implementation, in the above method and system, Wherein in the step B and step C and in the first file conversion unit, the second file conversion and the encryption unit; the resources division is optimized by one of the following procedures:

Procedure 1: having the application layer of codes directly call the system layer of codes by executing an external order of codes, and distributing the recourse of single core of the CPU effectively by parallel processing, multi-threading channel function coordinating with multitasking microinstruction on processor of the hardware, multi-core microinstruction, encryption microinstruction or decryption microinstruction; and Procedure 2: setting a virtual machine unit in at least one of the first file conversion unit, the second file conversion unit and the encryption unit, wherein the virtual machine unit executes parallel computing technology, clustered hosting technology, CUDA parallel computing, or parallel computing structure technology.

Embodiments of the present invention will be described by way of exemplary embodiments, but not limitations, illustrated in the accompanying drawings in which like references denote similar elements.

DETAILED DESCRIPTIONS OF PREFERRED EMBODIMENTS

Figure 1A:
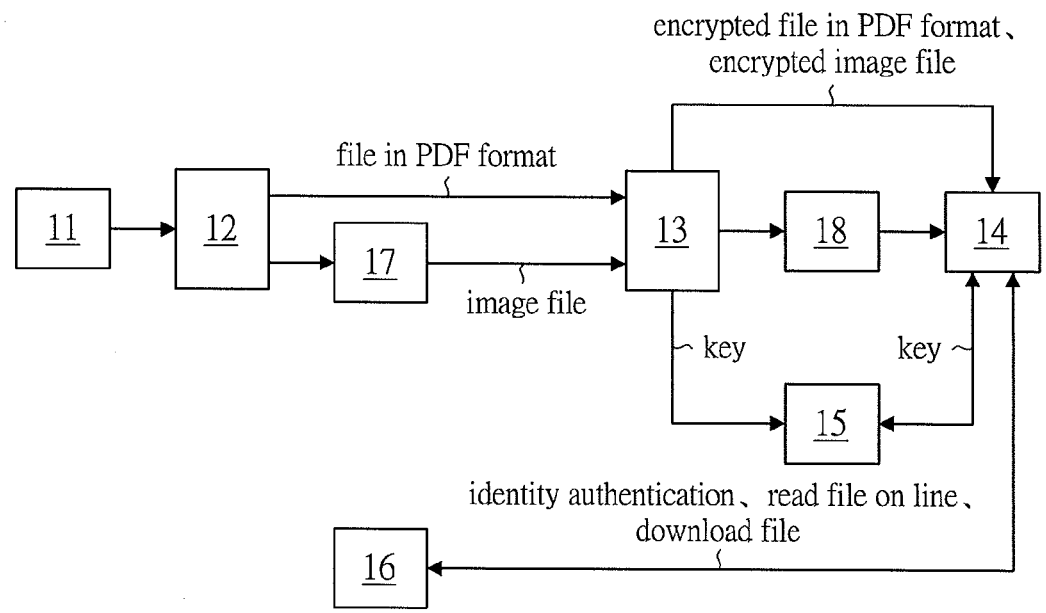
FIG. 1A and FIG. 1B are schematic views of an embodiment of the system for adding dynamic labels to a file and encrypting the file according to the present invention.
Figure 1B:
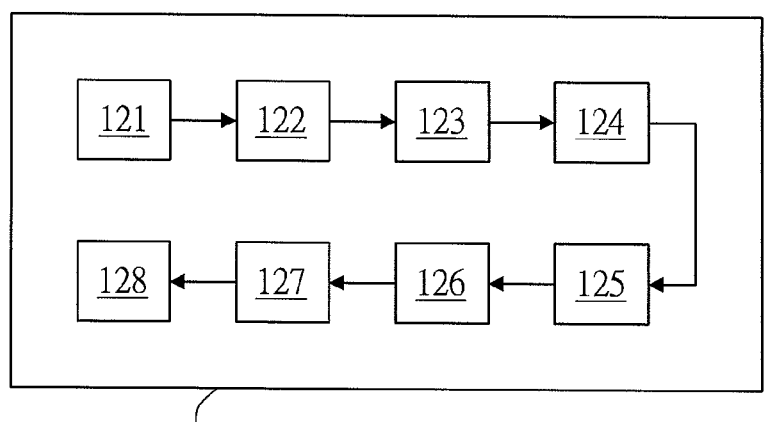

The present invention discloses a method and system for adding dynamic labels to a file and encrypting the file. Referring to FIG. 1A, the system comprises a file uploading unit 11, a first file converting unit 12, a encryption unit 13, a first storage unit 14, a second storage unit 15, a user Interface 16, a second file converting unit 17, and a compression unit 18. The file uploading unit 11 is connected with the first file converting unit 12. The first file converting unit 12 is connected with the second file converting unit 17. The encryption unit 13 is connected with the first storage unit 14, the compression unit 18 and the second storage unit 5, wherein the first storage unit 14, the second storage unit 15 and the compression unit 18 are connected with each other; the user Interface 16 is connected with the first storage unit 14. The file uploading unit 11 could be a file uploading device for transferring file in general consumer electronics, such as computers, smart phones, fax machines, scanners, camera equipments and video equipments, to the first file converting unit 12, wherein the first file converting unit 12, the encryption unit 13, the first storage unit 14, and the second storage unit 15 could be personal devices, such as computers, tablet computers, smart phones and servers, for processing and calculating a lot of data when a lot of users are online The first storage unit 14 of the present invention could be connected with a cloud computing system. Advantage of cloud computing system is that the effects of expanding its dynamic features and sharing its hardware and software resources by virtualized recourse and information service provided through the Internet.

Figure 2A:
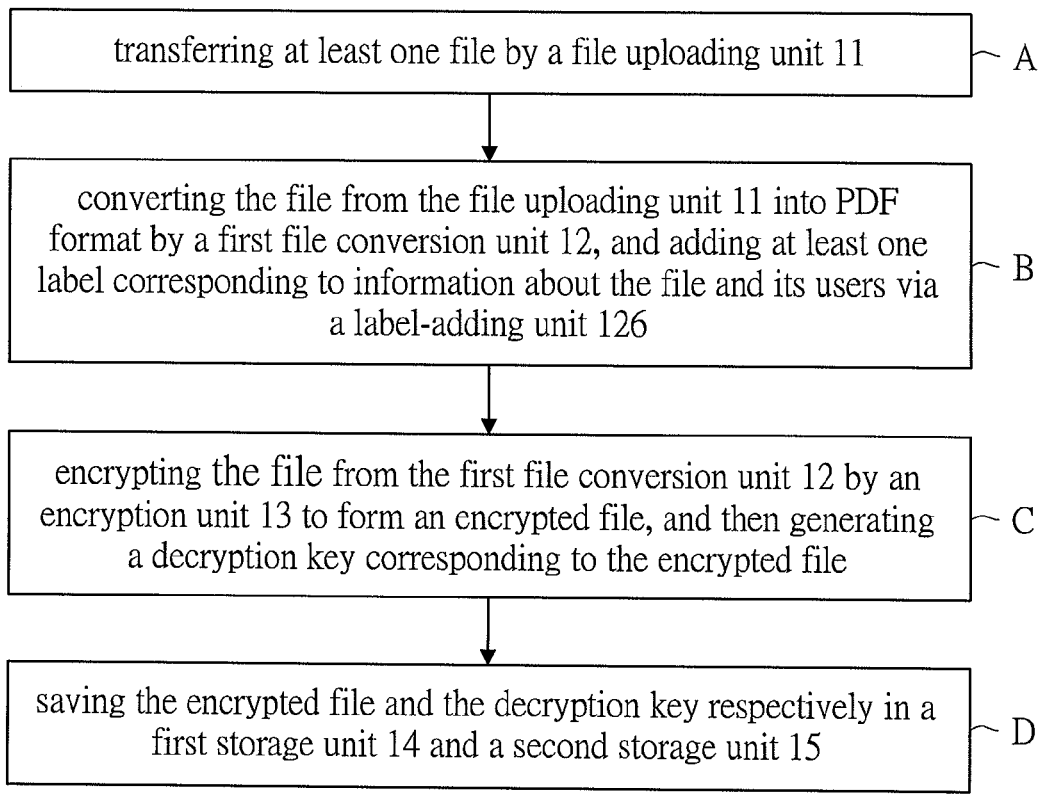
FIGS. 2A-2C are process diagrams of an embodiment of the method for adding dynamic labels to a file and encrypting the file according to the present invention.
Figure 2C:
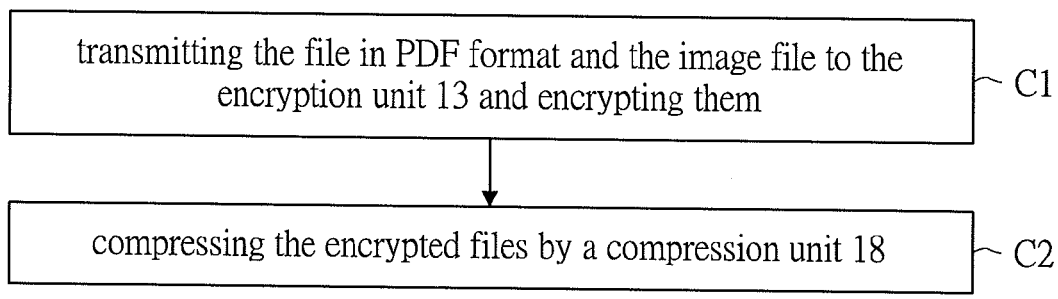
Figure 2B:
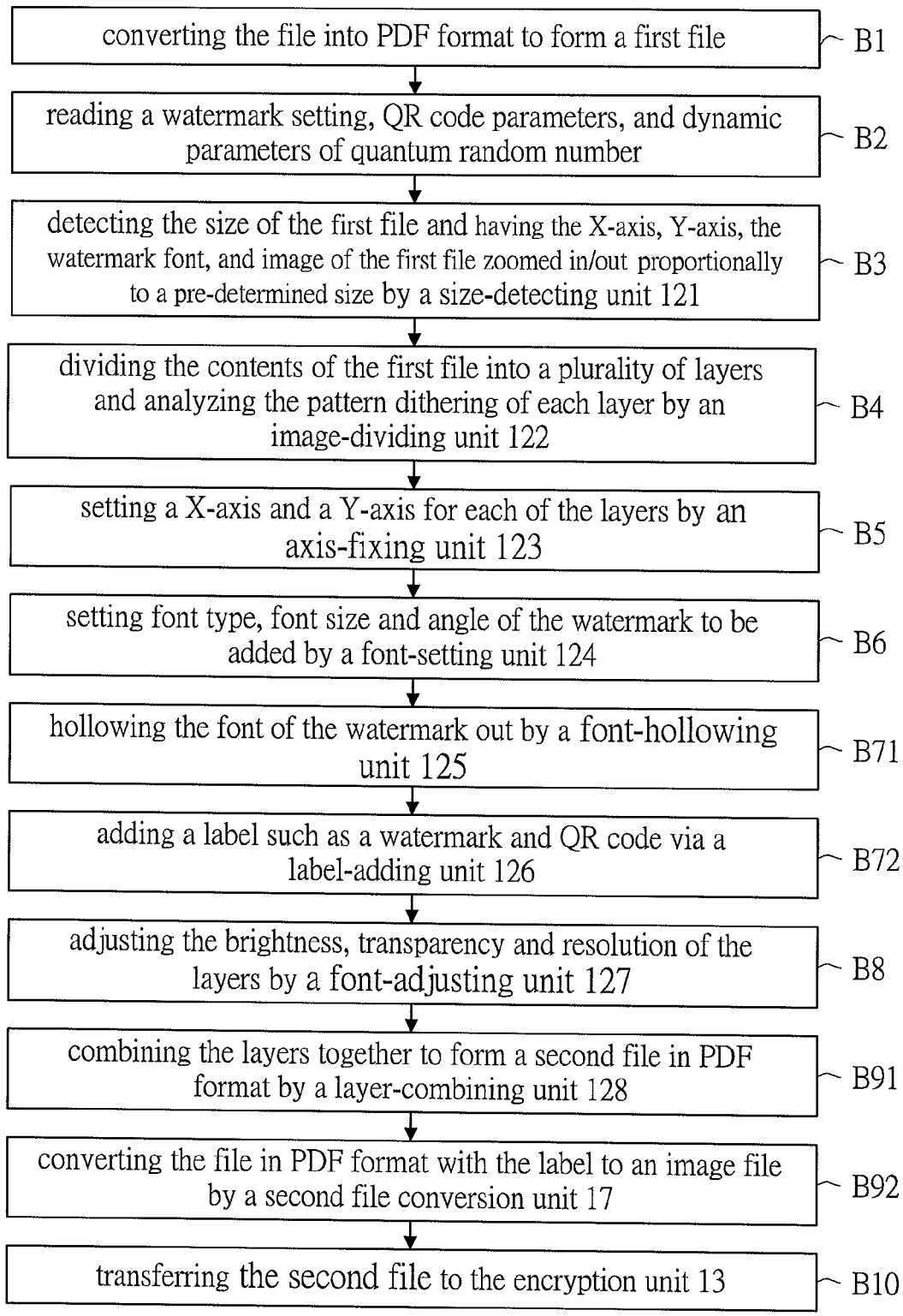

Referring to FIGS. 2A, 2B and 2C, the method for adding dynamic labels to a file and encrypting the file will be described in detail below. The present invention provides a method and system for adding dynamic labels to a file and encrypting the file, after having the file be converted and added with at least one label related to information about the file and users, the file is encrypted according to the needs of the users for reading after decryption, including following steps:

Step A: transferring the file from the file uploading unit 11 to the first file converting unit 12. Before transferring the file to the first file converting unit 12.

The system of the present invention can set a plurality of user data folder read in accordance with user's authority to prevent data be stolen or read unintentionally. The format of the files could be various image file such as BMP, GIF, JPEG, JPG, SVG, TIFF, TIF, PNG, YUV and EPS; text file in Windows, IOS and Linux that can be read or use via the software like Notepad, Word, Powerpoint, Excel, iWork, Pages, Numbers, Keynote, Writer, Calc, Impress, Draw and Math.

Step B: converting the file from the file uploading unit into PDF format by a first file conversion unit, and adding at least one label corresponding to information about the file and its users via a label-adding unit, wherein the step B further including following steps:

Step B1: for maintaining the quality of the file, converting the file into PDF format to form a first file;

Step B2: Read a watermark setting, QR code parameters and dynamic parameters of quantum random number;

Step B3: detecting the size of the first file by a size-detecting unit 121 due to the uploading file could be non-A4 size such as B4, B3, A3, and having the X-axis, Y-axis, the watermark font, and image of the first file zoomed in/out proportionally to a pre-determined size by the size-detecting unit 121;

Step B4: dividing the contents of the first file into a plurality of layers and analyzing the pattern dithering of each layer by an image-dividing unit 122;

Step B5: setting a X-axis and a Y-axis for each of the layers by an axis-fixing unit 123 in order to set watermark or action at the each page of the file;

Step B6: setting font type, font size and angle of the watermark to be added by a font-setting unit 124 according to the need of the administrator;

Step B71: hollowing the font of the watermark out by a font-hollowing unit 125.

Therefore, added font of the watermark may be read by user and doesn't affect the reading speed of the user. This step is the important technical features of the present invention. If using hollowed fonts set by plug-in font packages, the size of the files added with watermark will increase significantly because including the hollowed fonts set by plug-in font packages. The technical feature of present invention can have the various fonts built in Windows, IOS and Linux including English, Simplified Chinese, Traditional Chinese, Japanese, French, German, Spanish and Portuguese be hollow up, adjust its brightness, thickness, size, color and angle of outline of fonts. By which, the capacity of the file added with watermark is larger than the original file within 5 to 10 percent. Therefore, the system of the present invention can avoid occupying too much network bandwidth and system resource when 1 to more than 1000000000 users online use the system of the present invention due to users browse the file with large size, so that the overall browsing speed will slows down;

Step B72: adding at least one label such as water mark and QR code and its users via a label-adding unit 126, administrator can add one to plurality of watermark or/and QR code (including One-dimensional, two-dimensional or three-dimensional QR code) selectively in specific page according to its confidentiality level. QR code is made via conventional program and reduced to 0.1 cm*0.1 cm. The instant dynamic information in watermark and QR code is from the user Interface 16. After the user interface 16 recognizes the user and makes sure the identity of the user, the first file conversion unit 12 will receive at least one of the following instant dynamic information: dynamic parameters of quantum random number, IP address, user address, UUID code, CPU code, device code, finger print, company name, department name, login-in time, upload timestamps, download time stamps, download number stamps, open timestamps, feature code, certification code, registration code, checking point code, and authorization code. By which, the entire information of the user that read the file is recorded and saved within the watermark and QR code in the pages of the file. If the page of the file is stolen by miniature camera or print screen, took off in public scanner, or someone forgets to destroy the page when printing it out. In these circumstances, since the system of the present invention saves the complete information of the user that read the file, the administrator can find out the trail of the leak point in the first time and can quickly react corresponding to such conditions including bug fixing, finding out thief, and searching for leak point. In addition, the label may be trademark, the image and text made by individual, data bit (message data for allocating objects), radio frequency identification tag (RFID) and smart tag;

Step B8: adjusting the brightness, transparency and resolution of the layers by a font-adjusting unit 127, so that there is no blurred part or image distortion after combining the watermark and QR code with the layers, so as to meet the information confidentiality and be suitable for user to view;

Step B91: combining the layers together to form a second file in PDF format by a layer-combining unit 128, wherein the PDF format is PDF ISO-32000-2:2015 (suitable in PDF 2.0), PDF ISO-32000-1:2008 (suitable in PDF 1.7), ISO-32000-15, ISO 15930-1:2001'ISO 15930-3:2002; Extend to PDF/X (ISO standards, applicable to exchange of graphic content), PDF/A (ISO standards, applicable to long-term saving of electronic documents), PDF/E (ISO standards, applicable to the engineering file of interactive exchange), PDF/UA, PDF/VT's; following combination that in accord with PDF standards include: PDF/X (since 2001—series of ISO 15929 and ISO 15930 standards), PDF/A (since 2005—series of ISO 19005 standards), PDF/E (since 2008—ISO 24517), PDF/VT (since 2010—ISO 16612-2), or PDF/UA (since 2012—ISO 14289-1). The file in PDF format is downloaded for high access authority user to read offline and can be added with a AES-256 bit encrypted password that is compatible to and built-in PDF Reader software. Administrator can add different digital signatures corresponding to various access authorities to the files according to the contents of the file, so as to increase the information security;

Step B92: converting the file in PDF format with the label to an image file (BMP, JPG, JEPG, GIF, PNG, TIF) by a second file conversion unit 17 for the user read online via the user Interface 16;

Step B10: transferring the file in PDF format to the encryption unit 13.

Step C: encrypting the file from the first file conversion unit 12 by an encryption unit 13 to form an encrypted file, and then generating a decryption key corresponding to the encrypted file, wherein in the Step C further including:

Step C1: transmitting the file in PDF format and the image file to the encryption unit 13 and encrypting them. The encryption uses at least one of the methods including AES-ECB (key length: 128, 192, 256), CBC (key length:128, 192, 256), CTR (key length:128, 192, 256), CCM (key length:128, 192, 256), OFB (key length: 128, 192, 256), GCM (key length:128, 192, 256), CFB 1(key length:128, 192, 256), CFB 8(key length:128, 192, 256), CFB 128(key length:128, 192, 256), RC4 128-bit, RC4 40-bit,DES,TDES and Threefish, and generates respectively corresponding keys.

Step C2: After encrypting PDF format and the image file, compressing the encrypted files by a compression unit 18. The compression process uses public compression software like ZIP and provided additional protection via AES-256 encryption built in ZIP. Moreover, the method and system of the present invention can encrypt the encrypted and compressed file again, thereby forming multiple protection, this step will increase the time to decrypting files with brute-force attack and reduces the chance of leakage of important information;

Step D: saving the encrypted file and the decryption key respectively in the first storage unit 14 and the second storage unit 1, and the round number of encrypting process described above is adjustable.

In view of information security, the first storage unit 14 and the second storage unit 15 are set in different servers, but they are also can be set in the same server for the sake of convenience. The first storage unit 14 and the second storage unit 15 are also encrypted by AES256 encryption, which would enhance security of file storage and key storage. In the same way, when the file is decrypted for reading, after recognizing the identity of the user, the user can access to the file in the first storage unit 14 according to user's authority via the user Interface 16. At the same time, the second storage unit 15 will transmit the key corresponding to the user's authority and saved in the second storage unit 15 to the first storage unit 14 after the first storage unit 14 decompresses the file, so as to decrypting the encrypted file, and thus the file can be read by the user in the user interface 16. High-authority user is permitted to download the file to a personal device, such as computers, smart phones, and tablet computers, or to print the file out for offline reading. When printing, the label can be printed by invisible ink, so as to make the label unaware. When the user interface 16 is idled for a short time (for example, 5 minutes) without being instructed to perform any action, the first storage unit 14 will delete the decrypted and decompressed file automatically to protect the information security.

Moreover, when the first file converting unit 12, the second file conversion unit 17, the encryption unit 13, the first storage unit 14, the second storage unit 15, and the compression unit 18 perform their functions, their process will be recorded. Alternatively, The first storage unit 14 has the function of setting the authority of user interface 16, including: to enable/disable the printing of the full text, high/low printing resolution and to enable/disable to line, mark or annotate the encrypted files. Alternatively, in the above method and system, the connections between the file upload unit 11, the first file conversion unit 12, the encryption unit 13, the first storage unit 14, the second storage unit 15, the user Interface 16, the second file conversion unit 17, and the compression unit 18 are all provided with SSL (secure socket layer) encryption and the communications protocol that meet the public and private key encryption standard.

Figure 3:
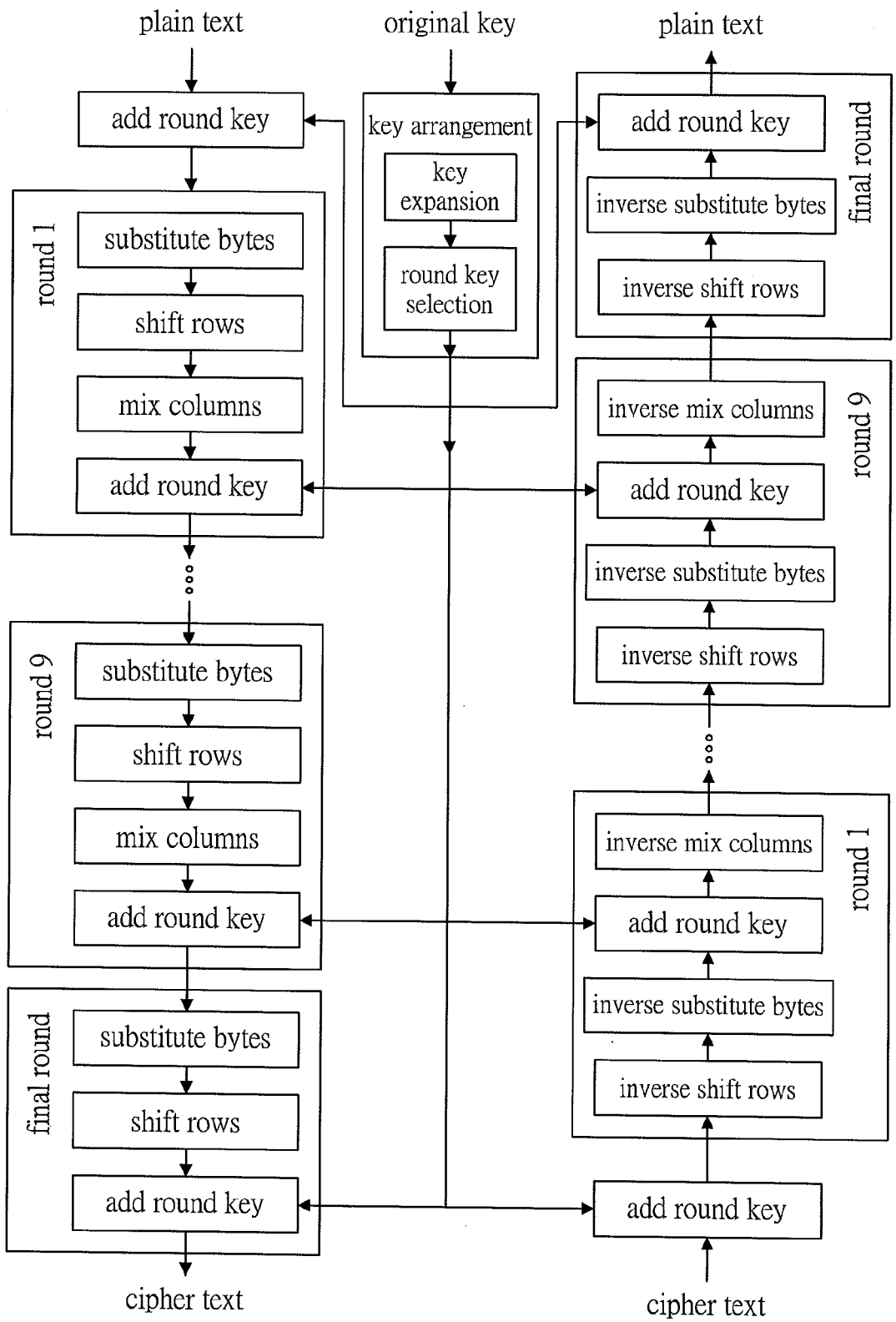
FIG. 3 is a diagram of encrypting and decrypting processes of an embodiment of the method and system for adding dynamic labels to a file and encrypting the file according to the present invention.

AES encryption process of the present invention will be described hereinafter. Referring to FIG. 3, AES has a plain text size of 128 bits, and a key size of 128, 192, or 256 bits. The number of cycles of encryption can be set as 10 to 14 cycles according to the need of the administrator. The AES operates on a 4×4 column-major order matrix of bytes. Its initial value is a plaintext block (one element in the matrix is one byte in the plaintext). A 128 byte key can be set by administrator or generated by specific system. After key expansion step and a round key selection step, the round key corresponding to number of cycle of the encryption is generated. During the encryption process, each AES encryption cycle (except for the final round) has four steps:

1. Step of adding round key: each byte of the matrix is combined with a block of the round key using XOR, and each sub-key is generated by the key generation scheme;
2. Step of substituting bytes: through a non-linear substitution S-box, the S-box is constructed by combining the multiplication inverse element with an invertible affine transformations, where each byte is replaced with corresponding byte according to a lookup table;
3. Step of shifting rows: Each row in the matrix is shifted cyclically;
4. Step of mixing columns: in order to fully mixing the operation of each column in the matrix, the four bytes of each column of the state are combined using an invertible linear transformation. At the final round, the step of mix columns is omitted.

When in decryption process, referring to FIG. 3, the functions of the previous step of sub bytes, shift rows and mix columns are all reversible. The decryption process is fulfilled via inverse function of sub bytes, shift rows, and mix columns. The inverse operation of add round key is that the cipher text is combined with the key of each round by using XOR operation, thereby generating a plain text of each round.

Figure 4A:
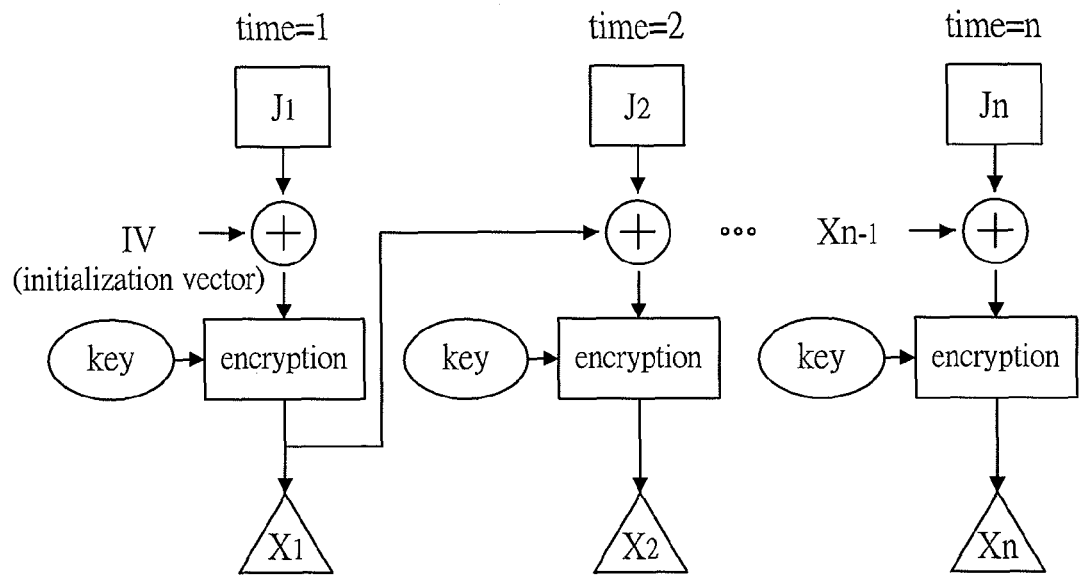
FIG. 4A and FIG. 4B are schematic views of cipher block chaining mode (CBC) of the method and system for adding dynamic labels to a file and encrypting the file according to the present invention.
Figure 4B:
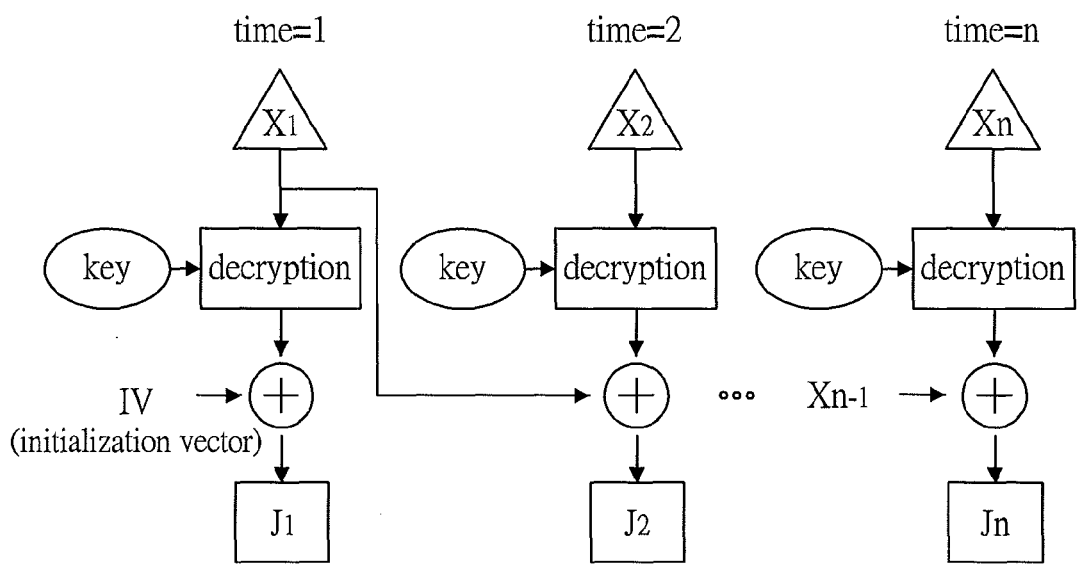

The encryption unit 13 of the present invention can provide cipher block chaining model (CBC) of AES decryption. Referring to the FIG. 4A, initialization vector (IV) with the same length as the plaintext can be set as according to the information such as date of encryption and time. After each byte of the first plaintext block (J1) is combined with initialization vector by using XOR operation, and is applied with cipher block chaining model (CBC), a first block cipher text (X1) is generated. The second block of plaintext (J2) must be combined with the first block of cipher text (X1) by using XOR operation first, and then is applied with the same decryption process, thereby generating a second block cipher text (X2). Namely, before the block is encrypted each round, each block must be combined with a cipher text generated via last plaintext by using XOR operation, and then be encrypted. So the process is carried out orderly. Finally, cipher texts are chained together with each other. During the decryption process, referring to FIG. 4B, the plain text is generated by series of inverse operation of the decryption process.

The method and system of the present invention can allocate resources efficiently. Accordingly, it allows 1 to more than 1000000000 users to use the system online at the same time. In the step B and step C, the resources division is optimized by one of the following procedures:

Procedure 1: Layer structure of programming languages can be divided into at least the application layer, data access layer (for system calling) and system layer . . . etc. The present invention could have the application layer of codes directly call the system layer of codes by executing an external order of codes of program language such as JAVA and skip language conversion layer. The present invention could avoid wasting system resources through the process of language converting layer. In the same way, using external order of codes of C++ can also achieve the similar effect. Distributing the recourse of single core of the CPU effectively by parallel processing, multi-threading channel function coordinating with multitasking microinstruction on processor of the hardware, multi-core microinstruction, encryption microinstruction or decryption microinstruction, so that the first file conversion unit, the second file conversion unit, the encryption unit, the units described below and program languages can achieve coordinating operation so as to achieve the purposes of encryption, decryption and reading the content of the file synchronously online. Wherein the hardware that is suitable for the method described below includes 32 bit ARM or 64 bit Intel Atom CPU;

Procedure 2: setting a virtual machine unit in at least one of the first file conversion unit, the second file conversion unit and the encryption unit, wherein the virtual machine unit executes parallel computing technology, clustered hosting technology, CUDA parallel computing, or parallel computing structure technology. By which, the present invention can achieve the purpose of cloud computing, encryption, decryption and reading the content of the decrypted file synchronously online. The virtual machine can execute Linux and Windows. The method and system of the present invention can directly allocate the priority of the procedures that operated via the resources in the hardware due to the function like multi-tasking and better hardware resource allocation that Linux has. Parallel computing can divide the procedure of calculation into a plurality of units, and the same type of calculating procedure at the same time in order to make the best use of system resources. Clustered hosting can be applied in plurality of computers, servers, thereby allocating the resource loading of the system in order to facilitate system stability and efficiency while reducing the interference of executing in computer or server.

In other words, the situation that procedures the encryption unit and the file conversion unit of the present invention would occupy higher hardware resources can be improved by executing an external order of codes of program language, parallel computing, clustered hosting, CUDA parallel computing, or parallel computing structure technology.

Therefore, according to above description, even if the content of the file is stolen by capturing the image on the screen or miniature camera by someone, the relevant department can quickly find out the source of leak point or the bug of the system and react quickly because each page of the file is added with a instant dynamic label. Thereby, it could enhance the information security efficiency for governmental, banking, national defense, enterprise, organizational and medical institutions. Even when the file downloaded by high-level authority user for reading offline is stolen or its digital signature is forged, there is a lot of instant dynamic information in the content of the label of file. It can provide a lot of information with a high degree of identification characteristics. It is helpful to recognize the source of the file. Moreover, the step of label-adding is an irreversible step, so as to increase the difficulty of stealing information.

The present invention also can be applied in common security video system in governments, enterprise, stores, and houses. Since the conventional security video system lacks authentication mechanisms for captured images, the information like recording time, facial features . . . etc on the captured image may be falsified by someone. However, the captured images from security video system can be added with watermark or QR code that has instant dynamic information according to the present invention, so as to enhance Confidentiality, Authenticity, Controllability, Availability, Integrity, and Non-repudiation of the captured images from security video system. Therefore, the captured images can be used as an important legal basis.

Two-factor authentication can be applied in the present invention, so as to enhance the efficiency of information security. During the identification via user interface 16 of the present invention, in addition to setting a user ID/password and SSL connection, it is also able to set up a private key obtained by user, such as particular USB Key, IC card, or magnetic card, together with biometric technologies such as the iris recognition, voice recognition, retina scanning, facial recognition, and fingerprint recognition, and together with multiple certification for the key corresponds to each encrypted file. It ensures that there is no leakage for each file stored by user when reading the content of the file online.

Moreover, the present invention can be applied in bit coin, e-commerce, stock, bonds and other financial Interface. According to the present invention, the certification paper documents can be added with instant dynamic label including the information about the user, which is certified by National units or government agencies, and be added with watermark and QR code having additional information such as ID number social Security number, bank account number, and credit card number. Therefore, such labels could be printed out and used as a paper proof For example, the paper proof can be used to prove someone's identity when his wallet is lost abroad, or it can be valid transaction documents in addition to the commercial electronic data. At least 19 kinds of instant dynamic information of the present invention can be applied in multi-factor authentication, which is more identifiable and reliability than the seal, stamp, barcode, and is able to enhance the reliability, convenience, identification and security for the certified documents of the existing governmental, banking, national defense, enterprise, organizational, medical institutions, e-commerce systems and a variety of security systems.

Accordingly, the present invention has the following advantages:

1. According to the present invention, adding label such as watermark, QR code and dynamic parameters of quantum random number to the file and compressing the file can effectively reduce the size of the file after be converted. Therefore, the governmental, banking, national defense, enterprise, organizational and medical institutions can upload a lot of confidential information from past, now and future to a data storage system without occupying too much storage space and network bandwidth. Moreover, the present invention can reduce the information leakage problem significantly.
2. Each file is encrypted through AES-256 bit encryption and stored, and the key corresponding to the encrypted file is stored in different location. Even the information in one of the location is leaked, the contents of the file would not be stolen immediately, so as to enhance the information security of the file. Moreover, the uploading file of the present invention has multiple defenses, including the file added with built-in password of PDF software, built-in password of compression software, AES-256 bit encryption and open SSL. The present invention can dynamically adjust the defense method and defense level of according to user authority and management requirement, so as to meet the future needs of information defense.

3. The Confidentiality, Authenticity, Controllability, Availability, Integrity and Non-repudiation of the file will be improved significantly by adding label corresponding to at least 19 kinds of information about the file and its users to the confidential files. When confidential files are leaked, stolen or falsified, the administrator can find out the trail of the leak point or bug of the system at the first time and can quickly react corresponding to such conditions.

4. The present invention has wide applications. In addition to the applications in governmental, banking, national defense, enterprise, organizational and medical institutions to enhance the information security protection, the present invention can be applied in other fields such as video security systems, e-commerce, and personal data security.

5. The method and system of the present invention can allocate resources and compress information efficiently. Even 1 to more than 1,000,000,000 users upload and read a lot of file online at the same time, hardware resource required for the method and system of the present invention is relatively limited, so as to achieve the best efficiency.

The description referred to the drawings stated above is only for the preferred embodiments of the present invention. Many equivalent local variations and modifications can still be made by those skilled at the field related with the present invention and do not depart from the spirit of the present invention, and they should be regarded to fall into the scope defined by the appended claims.

As disclosed in the above description and attached drawings, the present invention can provide a method and system for adding dynamic labels to a file and encrypting the file. It is new and can be put into industrial use.

What is claimed is:

1. A method for adding dynamic labels to a file and encrypting the file, comprising steps of:
   Step A: transferring at least one file;
   Step B: converting the transferred file into PDF format and adding at least one label containing information about the file and its users; wherein the label is a watermark, QR code, or a combination of watermark and QR code;
   Step C: encrypting the file to form an encrypted file, and then generating a decryption key corresponding to the encrypted file; and
   Step D: saving the encrypted file and the decryption key respectively in a first storage unit and a second storage unit;
   wherein the step B of adding the watermark further includes steps of:
   B1: converting the transferred file into PDF format to form a first file;
   B2: reading a watermark setting;
   B3: detecting the size of the first file and having the X-axis, Y-axis, the watermark font, and image of the first file zoomed in/out proportionally to a pre-determined size;
   B4: dividing the contents of the first file into a plurality of layers and analyzing the pattern dithering of each layer;
   B5: setting a X-axis and a Y-axis for each of the layers;
   B6: setting font type, font size and angle of the watermark to be added;
   B7: hollowing the font of the watermark out;
   B8: adjusting the brightness, transparency and resolution of the layers;
   B9: combining the layers together to form a second file in PDF format;
   B10: transferring the second file, and
   wherein the PDF format in Step B is PDF ISO-32000-2:2015, PDF 150-32000-1:2008, ISO-32000-15, ISO 15930-1:2001, ISO 15930-3:2002; Extend to PDF / X, PDF / A, PDF / E, PDF / UA, PDF / VT's; following combination that in accordance with PDF standards include: PDF/X, PDF/A, PDF/E, PDF/VT, or PDF/UA.

2. The method as claimed in claim 1, further comprising a step B(1) between the step B and step C:
   B(1): converting the file in PDF format with the label to an image file;
   wherein, in step C, the file in PDF format and the image file are respectively encrypted, and the two decryption keys corresponding to the two encrypted files are respectively generated.

3. The method as claimed in claim 1, wherein the watermark and the QR code respectively store at least, one of following instant dynamic information:
   dynamic parameters of quantum random number, IP address, user address, UUID code, CPU code, device code, finger print, company name, department name, login-in time, upload timestamps, download time stamps, download number stamps, open timestamps, feature code, certification code, registration code, checking point code, and authorization code.

4. The method as claimed in claim 1, wherein the encryption in step C uses at least one of the methods including AES-ECB (key length: 128, 192, 256), CBC (key length: 128, 192, 256), CTR (key length:128, 192, 256), CCM (key length:128, 192, 256), OFB (key length:128, 192, 256), GCM (key length:128, 192, 256), CFB 1(key length:128, 192, 256), CFB 8(key length:128, 192, 256), CFB 128(key length:128, 192, 256), RC4 128-bit, RC4 40-bit,DES,TDES and Threefish.

5. The method as claimed in claim 1, further comprising a step C1 between the step C and step D:
   C1: compressing the encrypted file;
   wherein, in step D, the encrypted and compressed file and the decryption key are saved respectively in the first storage unit and the second storage unit.

6. The method as claimed in claim 1, wherein in the step B and step C, a resources division is optimized by one of the following procedures:
   Procedure 1: having a application layer of code directly call a system layer of codes by executing an external order of code, and distributing a recourse of single core of the CPU effectively by multi-threading channel function coordinating with multitasking microinstruction on processor of the hardware, multi-core microinstruction, encryption microinstruction or decryption microinstruction; and
   Procedure 2: setting a virtual machine unit in at least one of the first file conversion unit, the second file conversion unit and the encryption unit, wherein the virtual machine unit executes parallel computing technology, clustered hosting technology, CUDA parallel computing, or parallel computing structure technology.

7. A system for adding dynamic labels to a file and providing encryption in the file, comprising a processor being programmed to function as:
- a file uploading unit for uploading one file;
- a first file conversion unit, connected with the file uploading unit, for converting the file from the file uploading unit into PDF format;
- a label-adding unit, for adding to the file at least one label containing information about the file and users;
- wherein the label is either a watermark or QR code, or a combination of watermark and QR code; wherein the label-adding unit further comprises:
  - a size-detecting unit for detecting the size of the transferred file and zooming in/out proportionally the X-axis, Y-axis, the watermark font, and image of the file to pre-determined size;
  - an image-dividing unit for dividing the contents of the file into a plurality of layers and analyzing pattern dithering of the layers;
  - an axis-fixing unit for setting X-axis and Y-axis to each of the layers;
  - a font-setting unit for setting font type, font size and angle of the watermark;
  - a font-hollowing unit for hollowing the font of the watermark out;
  - an adjusting unit for adjusting the brightness, transparency and resolution of the layers;
  - a layer-combining unit for combining each of the layers together;
  - an encryption unit, for encrypting the file from the label-adding unit, and generate a decryption key corresponding to an encrypted file; and
  - a first storage unit and a second storage unit for respectively saving the encrypted file and the decryption key from the encryption unit,
- wherein the PDF format of the converted file in the first file conversion unit is PDF ISO-32000-2:2015, PDF ISO-32000-1:2008, ISO-32000-15, ISO 15930-1:2001, ISO 15930-3:2002; Extend to PDF / X, PDF / A, PDF / E, PDF / UA, PDF / VT's; following combination that in accordance with PDF standards include: PDF/X, PDF/A, PDF/E, PDF/VT, PDF/UA.

8. The system as claimed in claim 7, wherein the processor is programmed to function as a second file conversion unit for converting the file into an image.

9. The system as claimed in claim 7, wherein the watermark and the QR code respectively store at least one of following instant dynamic information:
dynamic parameters of quantum random number, IP address, user address, UUID code, CPU code, device code, finger print, company name, department name, login in time, upload timestamps, download time stamps, download number stamps, open timestamps, feature code, certification code, registration code, checking point code and authorization code.

10. The system as claimed in claim 7, wherein the encryption of the encryption unit is by the way of at least one of the AES- ECB (key length: 128, 192, 256), CBC (key length: 128, 192, 256), CTR (key length: 128, 192, 256), CCM (key length: 128, 192, 256), OFB (key length: 128, 192, 256), GCM (key length:128, 192, 256), CFB 1(key length: 128 , 192 , 256), CFB 8(key length:128, 192, 256), CFB 128(key length:128, 192, 256), RC4 128-bit, RC4 40-bit,DES,TDES and Threefish.

11. The system as claimed in claim 7, wherein the processor is programmed to function as a compression unit for compressing the encrypted file.

12. The system as claimed in claim 7, wherein an optimal resources division for the first file conversion unit, the second file conversion and the encryption unit is accomplished by at least one of the following procedures, comprising:
Procedure 1: having an application layer of code directly call a system layer of code by executing an external order of code, and distributing a recourse of single core of the CPU effectively by multi-threading channel function coordinating with multitasking microinstruction on processor of the hardware, multi-core microinstruction, encryption microinstruction or decryption microinstruction; and
Procedure 2: setting a virtual machine unit in at least one of the first file conversion unit, the second file conversion unit and the encryption unit, wherein the virtual machine unit executes parallel computing technology, clustered hosting technology, CUDA parallel computing, or parallel computing structure technology.

* * * * *